(12) United States Patent
Wiggins (10) Patent No.: US 6,519,722 B1
(45) Date of Patent: Feb. 11, 2003

(54) METHOD AND APPARATUS FOR CONTROLLING THE READ CLOCK SIGNAL RATE OF A FIRST-IN FIRST-OUT (FIFO) DATA MEMORY

(75) Inventor: David Wiggins, Belfast (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/533,565

(22) Filed: Mar. 22, 2000

(51) Int. Cl.[7] ................................................. G06F 11/00
(52) U.S. Cl. ......................................................... 714/707
(58) Field of Search .......................................... 714/707

(56) References Cited

U.S. PATENT DOCUMENTS 6,178,213 B1 * 1/2002 McCormack et al. ....... 714/707

* cited by examiner

Primary Examiner—Phung M. Chung
(74) Attorney, Agent, or Firm—Lee, Mann, Smith, McWilliams, Sweeney & Ohlson (57) ABSTRACT

A method and apparatus for controlling the read clock signal rate of a First-In First-Out data memory is provided. A control signal for controlling the read clock signal rate is derived from an error signal, wherein the level of data contained in the FIFO is used to generate the error signal. The control signal includes an integral element, which comprises the error signal, scaled by a first paramater and integrated over time, and a proportional element, which comprises the error signal scaled by a second parameter. In accordance with the invention, at least one of the first and second scaling parameters is varied in accordance with the absolute error signal level. In a preferred embodiment, the or each parameter is varied as an exponential function of the absolute error signal level. This results in the bandwidth of the apparatus varying exponentially with the absolute error signal level. The dynamic or adaptive nature of the bandwidth enables the apparatus to provide an output data stream with relatively low wander or jitter under normal operating conditions while preventing data loss due to FIFO overflow or underflow in extreme operating conditions. The invention has particular application in the desynchronization of plesiochronous data elements from a synchronous transmission format in a telecommunications network system.

24 Claims, 4 Drawing Sheets

METHOD AND APPARATUS FOR CONTROLLING THE READ CLOCK SIGNAL RATE OF A FIRST-IN FIRST-OUT (FIFO) DATA MEMORY

FIELD OF THE INVENTION

The present invention relates to a method and apparatus for controlling the read clock signal rate of a First-In First-Out (FIFO) data memory. The invention relates particularly, but not exclusively, to the desynchronisation, or demapping, of plesiochronous data elements from a Synchronous transmission format, in a telecommunications network system.

BACKGROUND TO THE INVENTION

It is well known to use a FIFO data memory, or buffer (hereinafter referred to as a FIFO), in the synchronisation, or desynchronisation, of data. For example, FIFOs are commonly used as an interface between two digital systems to compensate for variations in the rate at which data is required, or produced, by one or both of the systems.

In many applications, particularly telecommunications applications, the data-read from the FIFO must conform to one or more industry standards as laid down by, for example, the American National Standards Institute (ANSI) or the International Telecommunications Union Telecommunications Standardisation Sector (ITU-T). In particular, standards or specifications are laid down concerning the smoothness of the produced data stream. Smoothness is typically measured in terms of 'jitter' or 'wander' which are a common measure of how accurately the data rate or frequency conforms to a given standard.

It is known to employ a phase-locked loop (PLL) controller to control the rate at which data is read from a FIFO, and hence to control the smoothness of the produced output data stream. Conventionally, the PLL controller is implemented in hardware and comprises a voltage controlled oscillator coupled with an analogue filter in conventional manner. Not only must such controllers meet the applicable wander and jitter specifications during normal operating conditions, but they must also react quickly enough to prevent FIFO overflow or underflow in extreme operating conditions. It is found that conventional controllers are unable to meet the exacting standards which are demanded in modern applications, particularly in the telecommunications industry.

For example, in a synchronous transmission telecommunications network, such as a Synchronous Digital Hierarchy (SDH) or SONET network, it is often necessary to transmit plesiochronous data elements, or plesiochronous Digital Hierarchy (PDH) data elements, in accordance with the SDH data framing structure. To this end, each PDH data element is appended with control information, known as path overhead, to produce a corresponding SDH data element, known as a virtual container. A FIFO is normally used in the recovery or demapping of the PDH data elements from the SDH data elements. Typically, an input data stream comprising PDH data elements encoded in an SDH data framing structure is provided to a desynchronising apparatus, which includes a FIFO, and an output data stream is produced which comprises the decoded PDH data elements. Before each data element is fed to the FIFO, the path overhead is removed thereby creating gaps in the data stream. Thus, data is written to the FIFO at a non-uniform rate. Further, the rate at which data is written to the FIFO may vary as a result of pointer movements and mapping bits which are intrinsic in SDH systems.

The rate at which data is read out of the FIFO must be controlled to accommodate for non-uniformity and variations in the incoming data rate so that a sufficiently smooth output data stream may be produced during normal operating conditions. In addition FIFO overflow and underflow must be prevented in extreme operating conditions. It is found that a PLL controller of the type outlined above is inadequate for producing a data stream which meets the increasing standards required in modern telecommunications networks, particularly in mobile telephone networks.

SUMMARY OF THE INVENTION

According to a first aspect of the invention, there is provided an apparatus for controlling the read clock signal rate of a First-In First-Out (FIFO) data memory, the apparatus comprising:

an error detector module, responsive to a change in the quantity of data contained in the FIFO data memory to generate an error signal;

an integrator module, for integrating said error signal, scaled by a first scaling parameter, to generate an integrated error signal;

a control module, responsive to said error signal and to said integrated error signal, for generating a control signal which includes said error signal, scaled by a second scaling parameter, and said integrated error signal;

a read clock rate adjuster module, responsive to said control signal to adjust the rate of the read clock signal, wherein the control module is arranged to determine a value for at least one of the first and second variable scaling parameters according to the level of the error signal.

Varying the value of the or each scaling parameter in accordance with the level of the absolute error signal, makes the bandwidth of the apparatus dynamic and adaptable to the environment in which it operates. The apparatus becomes more sensitive (increased bandwidth) when the absolute error signal levels are high and this enables it to react quickly to changes in an input data stream to ensure that the FIFO does not overflow or underflow. The apparatus becomes less sensitive (decreased bandwidth) when the level of the error signal is low in order to smooth or filter out sharp changes in the input data stream. The apparatus is thus able to strike a balance between, on the one hand, reacting quickly when necessary and, on the other hand reacting more slowly, or smoothly, when possible.

In a preferred embodiment of the invention, the control module is arranged such that the or each determined scaling parameter value varies at a rate which increases as the absolute error signal level increases, and decreases as the absolute error signal level decreases. It is particularly preferred that the control module is arranged such that the or each determined scaling parameter value varies substantially in accordance with an exponential function of the absolute error signal level. The resulting response characteristics of the apparatus enable it to meet relatively stringent wander and jitter specifications while still preventing FIFO overflow and underflow.

Preferably, the control module is arranged to calculate the value of at least one of the first and second scaling parameters by application of a mathematical function to the absolute error signal level. Alternatively, the value is derived from a data array.

Preferably, the error signal is derived from the difference between a read address pointer of the FIFO data memory and a write address pointer of the FIFO data memory.

Preferably, the error signal comprises a series of discrete error values and the integrator module is arranged to perform a summation operation on the error values, the error values first having been scaled by said first scaling parameter. Advantageously, a data processor is used to implement the error detector module, the integrator module and the control module.

In a preferred embodiment, the read clock adjuster module is arranged to operate on a primary clock signal and comprises a first counter for dividing the primary clock signal to generate a nominal read clock signal. The read clock adjuster module is further arranged to add one or more primary clock cycles to one or more of the respective nominal primary clock cycle numbers when the control signal indicates that the read clock signal rate is to be decreased, and to subtract one or more primary clock cycles when the read clock signal rate is to be increased. Preferably, the number of primary clock cycles to which a cycle of the read clock signal corresponds is determined in accordance with a cycle pattern and the apparatus further includes a pattern selector module arranged to select one of a number of different cycle patterns depending on whether it is desired to speed up or slow down the read clock signal rate.

A second aspect of the invention provides a method of controlling the read clock signal rate of a First-In First-Out (FIFO) data memory, the method comprising:

generating an error signal responsive to a change in the quantity of data stored in the FIFO data memory;

generating an integrated error signal by performing an integration operation on said error signal scaled by a first scaling parameter;

generating a control signal which includes said error signal, scaled by a second scaling parameter, and said integrated error signal;

determining a value for at least one of said first or second scaling parameters according to the level of the error signal;

adjusting the read clock signal rate according to said control signal.

A third aspect of the invention provides a desynchronising apparatus for a telecommunications network system, the apparatus being arranged to receive an input data stream which comprises plesiochronous data elements decoded from a synchronous transmission format, and to produce an output data stream, comprising plesiochronous data elements, at a substantially constant frequency the desynchronising apparatus comprising an apparatus according to the first aspect of the invention.

A fourth aspect of the invention provides a method of controlling the read clock signal rate of a First-In First-Out data memory in a desynchronising apparatus according to the third aspect of the invention.

A fifth aspect of the invention provides a telecommunications network node including the apparatus of the first aspect of the invention.

Other aspects of the present invention will become apparent to those ordinary skilled in the art upon review of the following description of specific embodiments of the invention and with reference to the accompanying drawings.

BRIEF DESCRIPTION OF THE DRAWINGS

Embodiments of the invention are now described by way of example and with reference to the accompanying drawings in which.

DETAILED DESCRIPTION

Figure 1:
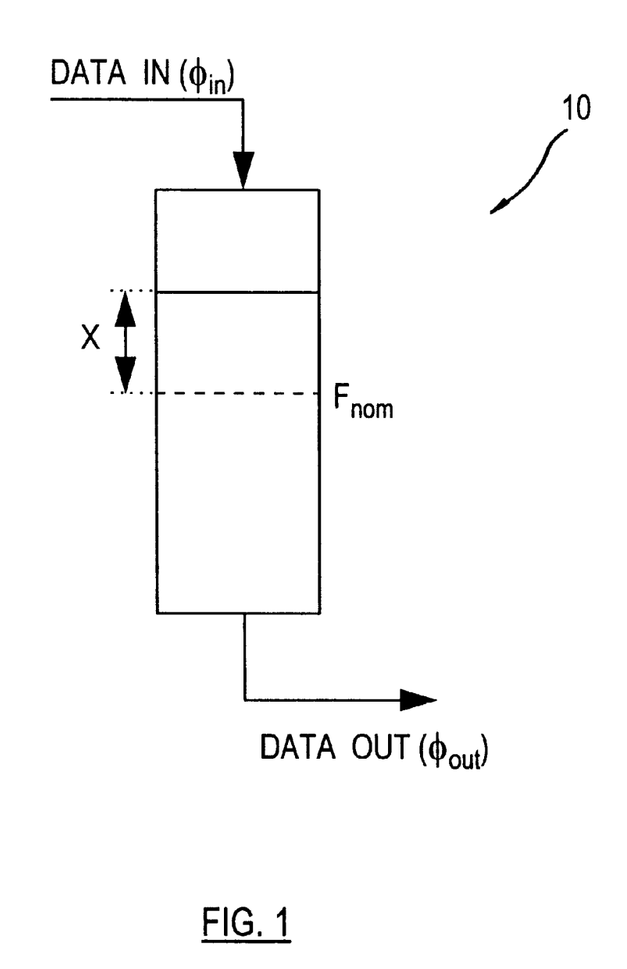
FIG. 1 is a schematic view of a FIFO data memory.

Referring now to FIG. 1 of the drawings there is shown, generally indicated at 10, a schematic view of a First-In First-Out (FIFO) data memory or data buffer, hereinafter referred to as FIFO 10. FIFO data memories are well known and typically comprise a dual port random access memory (RAM) having a data address system which allows input data elements to be stored sequentially, or in queue order, and removed in the same sequence.

In FIG. 1, an input data stream DATA IN comprises a sequence of data elements (not illustrated), for example data bits or bytes, which are written to, and stored in, FIFO 10 in the order in which they arrive under the control of a write clock signal (not illustrated). The data elements are read from, or removed, from the FIFO 10 in the same sequence in which they were written to produce an output data stream DATA OUT. The output data stream DATA OUT is produced under the control of a read clock signal (not illustrated). In particular, the read clock signal controls the rate at which data elements are read from the FIFO 10.

It will be noted that the data elements may be written to and read from the FIFO 10 in different groupings. For example, where each data element is a bit, data elements may be written to the FIFO 10 in groups of, say, eight bits (commonly referred to as eight-bit parallel) and read from the FIFO 10 one bit at a time (bit serial), or vice versa.

In use, the rate or frequency of the data read clock signal, or read rate, and the rate or frequency of the data write clock signal, or write rate, may differ from one another and the FIFO 10 acts as a buffer to compensate for differences in the respective rates. Clearly, when the write rate exceeds the read rate, the number of data elements stored in the FIFO 10 increases, and when the read rate exceeds the write rate, the number of data elements stored in the FIFO 10 decreases.

In many telecommunications applications the rate at which the input data stream DATA IN is provided, and therefore also the write rate, varies and it is necessary to control the read rate to accommodate for variations in the write rate. In particular, the read rate must be controlled to ensure that the FIFO 10 does not overflow, as this would result in loss of data. It is also important to ensure that the FIFO 10 does not become empty during use (underflow), since an attempt to read data from an empty FIFO 10 would interrupt the output data stream DATA OUT, thereby causing a sharp change in the signal frequency of the output data stream. FIFO data memories are relatively small in terms of data storage capacity and it will be apparent, therefore, that control of the read rate must be effected relatively quickly to meet these objectives. However, sharp or abrupt changes in the read rate causes a corresponding sharp or abrupt change in the output data frequency and this is unacceptable in many applications. Thus, control of the read rate should also be effected smoothly so that the output data stream DATA OUT meets any applicable standards or specifications, typically "jitter" or "wander" specifications. This task is normally made more difficult by the imposition of a maximum limit on the time taken by a given data element to pass through the FIFO 10, which in turn limits the size of the FIFO 10.

To accommodate both increases and decreases in the write rate, it is desirable to maintain an amount of data in the FIFO 10 corresponding to a nominal fill level $F_{nom}$. In FIG. 1, the amount by which the actual data level in the FIFO 10 differs from the nominal fill level $F_{nom}$ at a notional moment is represented by a fill-error X. It will be apparent that the fill-error X is determined by the cumulative effect of differences between the input data DATA IN rate and the output data DATA OUT rate over time.

A mathematical model for controlling the read rate is now described. For mathematical convenience, the input and output data streams can be considered in terms of phase, where DATA IN is represented by $\phi_{in}$ and DATA OUT is represented by $\phi_{out}$. The fill error X is thus determined by the $\phi_{in}$ minus $\phi_{out}$. The object of the control model is to adjust the read rate to reduce the absolute fill-error |X|. The control model uses a positional or proportional (P) control element as well as an integral (I) control element. Equation [1] can thus be derived for the read clock rate:

$$f_{out}=d\phi_{out}/dt=k_2\,(\phi_{in}-\phi_{out})+\int k_1\,(\phi_{in}-\phi_{out})dt \quad [1]$$

Where $f_{out}$ is the read clock signal frequency rate, or read rate; $k_1$ is a first scaling parameter for scaling the integral control element; $k_2$ is a second scaling parameter for scaling the proportional control element; and $(\phi_{in}-\phi_{out})$ is the fifo-fill level and is indicative of the fill-error X. Moreover, when the fill-error X is substituted for the fifo-fill level $(\phi_{in}-\phi_{out})$, equation [1] can be used to determine the required change in read rate to reduce, or eliminate, the fill-error X.

Taking Laplace transforms of equation [1], $$s\Phi_{out}=k_2\,(\Phi_{in}-\Phi_{out})+k_1\,(\Phi_{in}-\Phi_{out})/s \quad [2]$$

Rearranging gives:

$$\Phi_{out}=1/s\,(k_2+k_1/s)\,(\Phi_{in}-\Phi_{out}) \quad [3]$$

Figure 2:
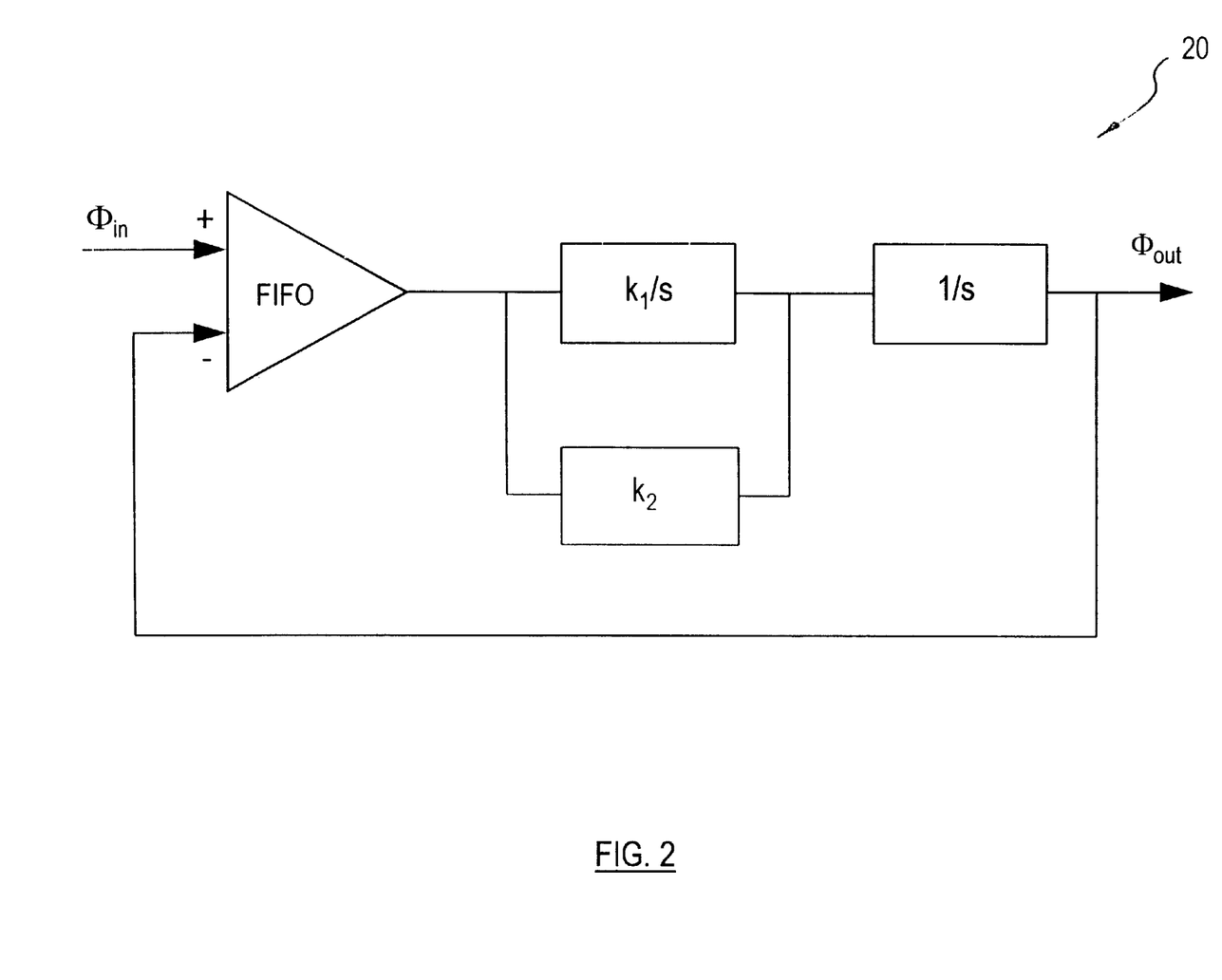
FIG. 2 is a schematic representation of a PLL control loop for use with the FIFO data memory of FIG. 1.

The mathematical model can be illustrated using a control loop model, generally indicated at 20 in FIG. 2. The control loop model 20 is commonly referred to as a phase-locked loop (PLL) or a PI control loop.

The transfer function F(s) for the control loop model 20 is:

$$F(s)=\frac{\Phi_{out}}{\Phi_{in}}=\frac{k_2 s+k_1}{s^2+k_2 s+k_1}=\frac{2\zeta\omega_n s+\omega_n^2}{s^2+2\zeta\omega_n s+\omega_n^2} \quad [4]$$

where $\zeta$ is the damping factor of the model and $\omega_n$ is the natural frequency.

Conventionally, such a control loop model 20 is implemented using analogue hardware components, typically a voltage controlled oscillator coupled to an analogue filter (not shown). A user (not shown) determines the respective values of the first and second scaling parameters $k_1$, $k_2$ by experiment, such as computer simulation, based on the required response of the control loop model 20. The respective values of $k_1$ and $k_2$ are implemented by selection of appropriate analogue components for the analogue filter. Thus in the conventional control system, once calculated and implemented, the respective values of $k_1$ and $k_2$ remain fixed or constant during the operation of the control system.

Increasingly, such conventional control systems are found to be inadequate for meeting the response requirements laid down by International Standards Bodies and commercial organisations. It is particularly problematic in the telecommunications network industry where standards, such as MTIE (Maximum Time Interval Error) specifications, laid down by Standards Bodies such as ITU-T, ETSI (European Telecommunications Standards Institute), and, in some cases, by commercial organisations, are often not met by employing conventional technology.

The method and apparatus of the present invention provide more dynamic control of the read clock signal rate of a FIFO data memory and are thus capable of satisfying relatively demanding data signal specifications.

It is proposed to use a control loop model 20 of the general type shown in FIG. 2 and described by equation [4]. In accordance with the invention, however, it is proposed to arrange that at least one of the first and second scaling parameters $k_1$, $k_2$ is varied depending on the size of the absolute fill-error |X|. Equally, it may be said that the or each scaling parameter $k_1$, $k_2$ is arranged to vary depending on the difference between the cumulative input data (DATA IN) and the cumulative output data (DATA OUT). It may also be said that the bandwidth, for example the 3 db bandwidth, of the resulting control system is arranged to vary depending on the size of the absolute fill-error |X|, or on the difference between the cumulative input data (DATA IN) and the cumulative output data (DATA OUT).

The preferred arrangement is such that the value of the or each scaling parameter $k_1$, $k_2$, and therefore also the bandwidth, is increased as the absolute fill-error |X| increases. Similarly, the value of the or each scaling parameter $k_1$, $k_2$ is decreased when the absolute fill-error |X| decreases. It is preferred that the rate at which the value of the or each scaling parameter $k_1$, $k_2$ varies increases as the absolute fill-error |X| increases, and decreases as the absolute fill-error decreases. Preferably still, the value of the or each scaling parameter $k_1$, $k_2$ is varied substantially in accordance with an exponential function of the absolute fill-error |X|. Thus the bandwith also varies exponentially with the level of the absolute fill-error |X|.

It is preferred that the damping factor of the implemented control system is constant, or substantially constant, and so there is a fixed relationship between the values of $k_1$ and $k_2$, as will be understood from equation [7] below. In the preferred embodiment, therefore, both scaling parameters $k_1$, $k_2$ are varied according to the absolute error signal level.

A control apparatus of the invention (not shown in FIG. 1) therefore applies relatively large rates of change in the read rate, when the absolute fill-error |X| is high, and relatively low rates of change of read rate when the absolute fill-error |X| is low. When the fill-error X is positive, namely when the level of data in the FIFO 10 exceeds the nominal fill-level $F_{nom}$, the control apparatus increases the read rate at a rate which increases as absolute fill-error |X| increases. When the fill error X is negative, namely when the level of data in the FIFO 10 is less than the nominal fill level $F_{nom}$, the control apparatus decreases the read rate at a rate which increases as absolute fill-error |X| increases. The control apparatus thus reacts very quickly to prevent overflow and underflow of the FIFO 10 (each of which occurs at relatively large values of absolute fill-error |X|), while still providing a relatively smooth output data stream DATA OUT under normal operating conditions, during which the absolute fill-error |X| tends to be relatively small. Varying the value of $k_1$ in accordance with an exponential function is found to be particularly advantageous in telecommunications network applications and allows relatively stringent jitter and wander specifications to be met during normal operating conditions while preventing overflow/underflow under extreme transients.

In the following description, it is assumed for illustrative purposes that the damping factor $\zeta$ is desired to be constant and that, accordingly, both scaling parameters $k_1$, $k_2$ are to be varied. The described apparatus first determines a value for $k_1$ and then determines a corresponding value for $k_2$. It will be apparent to a skilled person that $k_2$ could equally be determined first and then used to determine $k_1$. It will be further apparent that $k_1$ and $k_2$ may be determined independently of one another, particularly if it is not desired to maintain a constant damping factor.

For a given application, the value of $k_1$ can be determined in two main ways. Firstly, $k_1$ can be calculated in accordance with a mathematical function of the absolute fill-error $|X|$. Depending on the requirements of the application, the mathematical function may be, for example, a linear function in which $k_1$ increases linearly with absolute fill-error $|X|$. Alternatively, the value of $k_1$ may vary as a polynomial function of the absolute fill-error $|X|$. It is particularly preferred, however, to vary the value of $k_1$ as an exponential function of the absolute fill-error $|X|$, having the general form:

$$k_1 = A^{B|X|\pm C} \quad [6]$$

where A, B and C are constants whose values depend on the requirements of the application and can be determined experimentally by, for example, a computer simulation of the control system to be implemented.

It will be noted that the value of $k_1$ can alternatively be calculated as a function of the difference between the input data $\phi_{in}$ and the output data $\phi_{out}$ or, where the output data rate is desired to be constant, as a function of the change in input data rate. It is preferred to base calculations on the fill-error X since, in practice, the fill-error X can readily be measured, as is described in more detail below.

A second method of determining the value of $k_1$ is to construct a look-up table (not shown in FIG. 1) which tabulates values of $k_1$ with corresponding values of fill-error X. The table entries can be determined experimentally using, for example, computer simulations of the control system to be implemented, or by calculation using a mathematical function as described above.

Alternatively, $k_1$ may be tabulated against the difference between the input data fin and the output data $\phi_{out}$.

Figure 3:
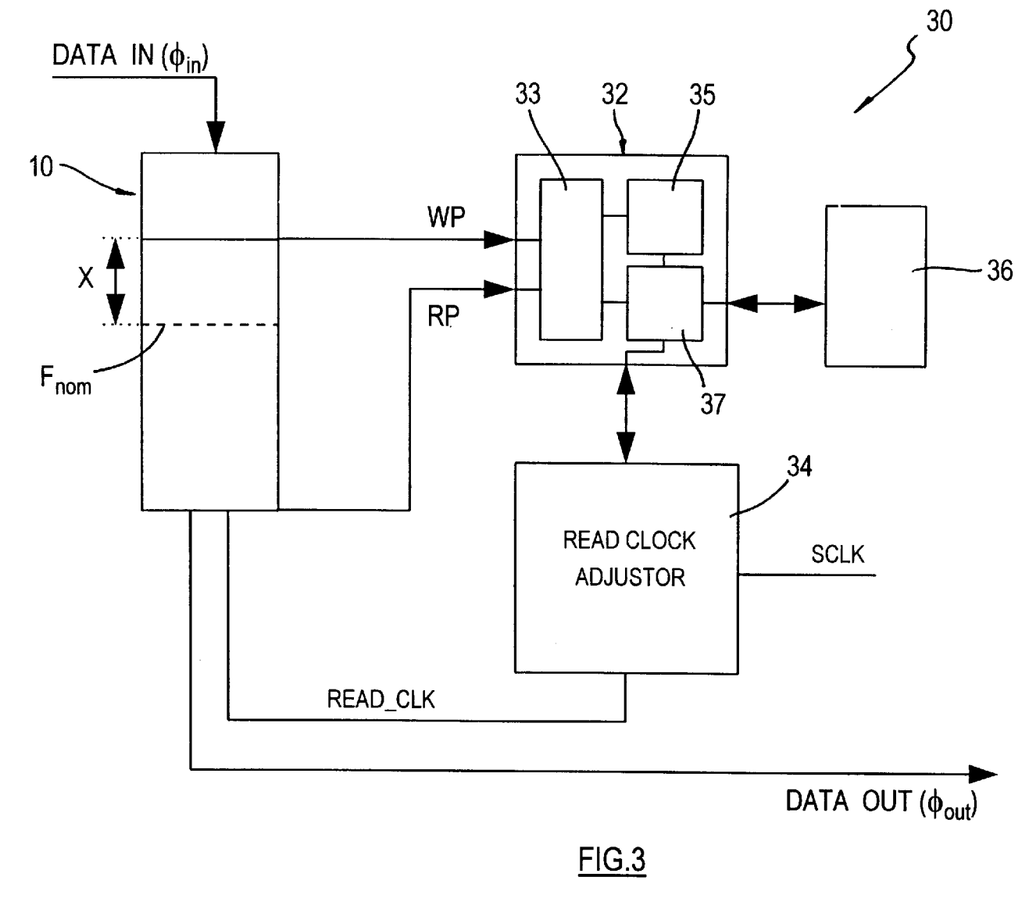
FIG. 3 is a schematic view of an apparatus for controlling the read clock signal rate of a FIFO data memory according to an embodiment of the invention.

FIG. 3 shows, in schematic view, an apparatus, generally indicated at 30, for controlling the read clock signal rate of a FIFO 10 in accordance with an embodiment of the invention. The control apparatus 30 preferably includes a data process 32, such as a conventional CISC or RISC processor, and a read clock signal adjuster module 34.

The FIFO 10, as is conventional, has a write address pointer WP, which points to the next address within the FIFO 10 to which a data element will be written, and a read address pointer RP, which points to the next address within the FIFO 10 from which a data element will be read. The nominal FIFO fill level $F_{nom}$ is preferably the half-full level of the FIFO 10. This enables increases and decreases in the input data DATA IN rate to be accommodated equally.

The data processor 32 is in communication with the FIFO 10 such that it can determine the state of the read and write address pointers RP, WP. The processor 32 is further in communication with the read clock generator 34.

Optionally, a look-up table 36 is provided which tabulates, preferably, the scaling parameter $k_1$ or a term which is indicative of $k_1$, or which includes $k_1$, against the fill-error X, or a term indicative thereof. The look-up table 36 can be implemented as an array of data entries, in, for example, a Read Only Memory (ROM).

The apparatus 30 is operable on a primary clock signal SCLK which may be generated either internally by the apparatus 30 or may be provided by an external source, such as a crystal oscillator (not shown), in conventional manner. The primary clock signal SCLK must oscillate at a higher rate than the required rate, or frequency, of the output data stream DATA OUT.

The read clock signal adjuster module 34 generates a read clock signal READ_CLK from the primary clock signal SCLK and in accordance with control information provided by a control signal generated by the data processor 32. To generate the said control signal, the data processor 32 is programmed to implement three main modules. Firstly, the data processor 32 is programmed to implement an error detector module 33 which generates an error signal the level of which depends on the quantity of data stored in the FIFO 10 and, in particular, depending on the fill-error X. The error detector module 33 reads the write and read address pointers WP, RP and, since $F_{nom}$ and the size of the FIFO 10 are known, calculates the fill-error X (measured, for example, in bits). The processor 32 also implements an integrator module 35 arranged to integrate the error signal, the error signal first having been scaled by $k_1$. In the preferred embodiment, which is described in more detail below, the error detector module 33 generates the error signal as a series of discrete samples of the fill-error X. The integrator module 35 thus is arranged to perform a summation operation on successive values of fill-error X, each scaled by a respective value for $k_1$, to produce the integrated error signal.

The processor 32 also implements a control module 37. The control module 37 generates a control signal derived from application of equation [1] to the error signal and the integrated error signal. As part of its operation, the control module 37 determines a value for the first scaling parameter $k_1$ according to the level of the fill-error X as measured by the error detector module 33. The control module 37 then supplies the determined value of $k_1$ to the integrator module 35 for generating the integrated error signal portion of the control signal.

The value of $k_1$ can be determined using either a mathematical function of X, for example equation [6], or using a look-up table 36. It is not necessary for the control module to determine a value for $k_1$ explicitly, particularly where a look-up table 36 is used, as will readily be understood from the preferred embodiment described hereinafter.

As is described in more detail below, it can be preferable to employ a look-up table 36 rather than using a mathematical function since it is found that fewer processing steps, or processor 32 cycles, are required to obtain a value from a look-up table 36 than are required to compute a mathematical function. This is clearly important where data processing speed is an issue.

The control module 37 also determines the value of parameter $k_2$ for scaling the proportional element of the control signal. An equation for determining $k_2$ can be derived from equation [4]. For example, where the damping factor $\zeta$ is desired to be 1, $k_2$ can be computed as follows:

$$k_2 = 2\sqrt{k_1}, \text{ for } \zeta=1 \quad [7]$$

As before, $k_2$ can be computed using the mathematical function [7], or can be obtained from a look-up table. In general, it is desirable for the damping factor to be substantially constant, although a damping factor of $\zeta=1$ is preferred.

The control signal determines how much the read clock signal (READ CLK) rate, must be varied corresponding to the measured value of fill-error X. The required change in the read clock signal rate, hereinafter referred to as the leak rate, can be derived from equation [1] for the measured value of fill-error X and the obtained corresponding values of $k_1$ and $k_2$. Since the fill-error X is measured as a discrete sample, equation [1] can be approximated as follows:

$$f_{out}=\Sigma((X)(k_1\Delta t))+((X)k_2) \qquad [8]$$

In general $f_{out}$ is equal to a nominal frequency $f_{nom}$ plus the leak rate. If it is assumed that the $f_{out}$ is equal to the nominal frequency $f_{nom}$ at time t=0, then equation [9] can be derived:

$$Leak\ rate=\Sigma((X)(k_1\Delta t))+((X)k_2) \qquad [9]$$

Where X is the fill-error, typically measured in bits and derivable from the write and read pointers WP, RP, and $\Delta t$ is the time period, measured in number of samples, over which the evaluation of leak rate takes place. $\Delta t$ is set equal to 1 for the computation. The summation of the successive ( (X) ($k_1\Delta t$)) terms represents the integrated error signal, in which individual fill-errors X are scaled by $k_1$ before summation.

The leak rate is included in the said control signal which is passed from the control module 37 to the read clock adjuster module 34. The read clock adjuster module 34 then adjusts the read clock signal READ_CLK according to the leak rate value as is now generally described. Since the READ_CLK signal is derived from the primary clock signal SCLK, each cycle of the READ_CLK signal comprises a plurality of SCLK cycles i.e. the read clock generator 34 uses the SCLK cycle as a counting unit and toggles the READ_CLK signal after counting a pre-determined number of SCLK cycles to produce the nominal READ_CLK frequency from Thus, the read clock adjuster module 34 can increase the frequency of READ_CLK by reducing the number of SCLK cycles counted before toggling READ_CLK, and decrease the frequency of READ_CLK by increasing the number of SCLK cycles counted. The number of SCLK cycles to be added to or removed from the READ_CLK signal over a given period of time is derived from the leak rate. Typically, the adjustment of READ_CLK is very fine. For example, one SCLK cycle may added or deleted over a period of hundred(s) of READ_CLK cycles.

The read clock adjuster module 34 produces the READ_CLK signal from the primary clock signal SCLK using an arrangement of counters (not shown in FIG. 3). A preferred embodiment of the read clock adjuster 34 is described in more detail below with reference to FIG. 4.

The apparatus 30 has particular, but not exclusive, application in the field of telecommunication network systems, and may advantageously be used in the desynchronisation or de-mapping of plesiochronous data elements from a synchronous transmission format. For example, the apparatus 30 may be used in the production of a PDH data stream from a SDH or SONET data stream. In such application, the input data stream DATA IN, provided by a source telecommunications network system (not shown) comprises SDH, or similar, data elements from which overhead data elements have been removed in conventional manner, to leave plesiochronous data elements. The removal of overhead and frequency adaptation elements results in gaps in the DATA IN stream which make the frequency of DATA IN non-uniform. The task of the apparatus 30 in this application is to control the read clock signal rate of the FIFO 10 to absorb the variations or non-uniformity in the DATA IN signal, and to produce an output data stream DATA OUT, for a target telecommunications network system (not shown), which comprises the recovered plesiochronous data elements, and whose frequency is sufficiently constant, or smooth, to satisfy the applicable standard or specification.

A specific embodiment of the apparatus 30 is now described, by way of example, and in the context of a desynchronising apparatus for recovering plesiochronous data from a synchronous data stream. For illustrative purposes, it is assumed that it is desired to produce an E1 (2.048 Mbits/s) PDH data stream from an SDH carrier data stream comprising VC-12 virtual containers. Normally, the produced PDH data stream is required to meet the ITU-T G.823 specification, or ETSI equivalent, for MTIE or 'wander'. Additionally, the apparatus 30 must produce an output data stream which conforms to one or more 'jitter' specifications such as the ITU-T G.783 or ETSI equivalent.

The apparatus 30 of the invention is able to meet and exceed these specifications.

The maximum size of the FIFO 10 in the present example is dictated by an ITU-T requirement that a data element should be delayed no longer than 125 μs by the descynchroniser containing the FIFO 10. In practice, this means that the FIFO 10 can be no larger than 24 bytes.

The input data stream DATA IN is written to the FIFO 10 in 8-bit parallel format and the output data stream DATA OUT is read from the FIFO 10 bit serially.

The data processor 32 reads, or samples, the write address and read address pointers periodically to determine the fifo fill level, that is, the quantity of data stored or contained within the FIFO 10. Using conventional ITU-T terminology for SDH transmission systems, the sampling rate for the present example is preferably once every four SDH multiframes, where one TU-12 represents one multiframe, comprising four frames, each of 125 μs. The sampling rate may be higher, for example once every multiframe, however this increases the processing power required by the processor 32. The sampling rate may also be lower although this affects the ability of the apparatus 30 to meet stringent specifications. There is no preferred instant with respect to the SDH framing structure at which to sample, although it is preferred that the time intervals between successive samples are substantially equal. It is also preferred that sampling occurs at the end of a complete TU-12 multiframe.

The primary clock signal SCLK is preferably a 77.76 MHz clock signal derived from, for example, a 77.76 MHz crystal oscillator (not shown) or the local 77.76 MHz SDH clock. The leak rate is calculated in leak units per 4-multiframes, where one leak unit represents one cycle of the SCLK signal.

Each time the fifo fill level is measured by the processor 32, it is preferably adjusted, or corrected, to compensate for SDH framing noise, which arises due to the fact that a TU-12 can finish on one of four possible columns within an SDH frame. This can lead to false readings of the fifo fill level and the processor 32 is therefore configured to add either 0, 0.5, 1 or 1.5 bits to the fifo fill level depending on the position of the TU-12.

The fifo fill level may be further corrected to account for any incomplete bytes, or spare bits, which are not written to the FIFO 10.

It is now described in detail how the processor 32 and the read clock adjuster module 34 control the read clock signal READ_CLK to produce an output data stream DATA OUT which conforms to the required wander and jitter specifications.

For illustrative purposes only, the sampling rate is once every four multiframes. The apparatus 30 is initialised to read out exactly 32 bytes from the FIFO 10 in one SDH frame (125 μs). This is done by initialising fill-error X to zero, and initialising the summation term $\Sigma(X)(k_1\Delta t)$ to zero. This means that all the leak rate calculations are relative to a nominal read clock signal rate which, in the present example, is the desired 2.048 Mbit/s of the E1 output data stream.

The leak rate is to be produced by the processor 32 in leak-units/4-multiframes, where one leak unit is one 77.76 MHz cycle and 4-multiframes is the sampling period.

The fifo-fill level is preferably measured in bits with a resolution of ½ bit (1 binary point). The fifo size is 24 bytes and thus the range of measurement is ½ to ±96 bits, assuming that $F_{nom}$ is taken to be the fifo half-full level. This requires 1(sign) +7(0–96) +1(½ bits)=9 bits.

From computer simulations based on the desired operating characteristics of the apparatus 30 as dictated by the ITU-T/ETSI specifications, values for the constants A, B and C for equation [6] can be determined to give the following equation for $k_1$:

$$k_1 = 10^{0.055|X|-4.4} \quad [6a]$$

where $|X|$ is absolute fill error in bits and $k_1$ is in seconds$^{-2}$.

Scaling parameter k2 can then be calculated from equation [7] and is measured in seconds$^{-1}$.

Changing time units to 4-multiframes:

$$k_1 = (10^{0.05|X|-4.4})/500^2, \quad [6b]$$

$$k_2 = (2. \text{ sqrt } (k_1))/500 \quad [7b]$$

where $|X|$ is in bits, $k_1$ is in 4-multiframes and $k_2$ is in 4-multiframes$^{-1}$.

The leak rate can then be calculated from equation [8] where $\Delta t$ is normally equal to one and the evaluations of the term $((X) (k_1\Delta t))$ for each successive sampling period are summed. The required units for leak rate are leak-units/4-multiframes, where one leak-unit is one 77.76 MHz cycle (=12.860082 ns=0.026337448 bits).

Optionally, values for $k_1$ and $k_2$ are determined from the look-up table 36, using the measured value of fill-error X. Each of the terms $((X) (k_1\Delta t))$ and $((X)k_2)$ of equation [8] may then be calculated by processor 32. Alternatively, and preferably, the look-up table 36 stores values of the terms $((X) (k_1\Delta t))$, hereinafter referred to as the k1-term, and $((X)k_2)$, hereinafter referred to as the k2-term, tabulated against fill-error X in units of leak-units/4-multiframes. This option is preferred as it reduces the number of processing steps or cycles to be performed by the processor 32 in calculating the leak rate. It will thus be apparent that the values of $k_1$ and $k_2$ do not need to be determined explicitly.

The look-up table 36 can store a look-up value, for the k1-term and k2-term, or for $k_1$ and $k_2$, as applicable, for all possible values of the fill-error X. Alternatively, the look-up table 36 may be a reduced look-up table which stores look-up values only for certain values of fill-error X, the intermediate values being calculated by the processor 32 by interpolation. For example, the k1-term and k2-term may be stored only for values of fill-error X which are whole bytes, the intermediate values being assumed to lie on a straight line between respective successive whole byte values. The choice between these alternatives is determined as a trade off between required memory capacity (for storing the look-up table 36) and the number of processing steps required to perform the interpolation.

In the preferred embodiment, the look-up table 36 stores only positive values for the k1-term and k2-term. Where negative values are required, they can be implemented using two's complement arithmetic. In general, it is preferred that the processor 32 uses two's complement arithmetic for all calculations concerning the leak rate.

The calculated leak rate is not necessarily a whole number. However, in the preferred embodiment of the invention, only a whole number of leak units are leaked, that is, added to or subtracted from, the nominal number of SCLK cycles in a cycle of READ_CLK, during a particular sampling period. Any fractional part of a calculated leak rate is carried forward for leaking during the next sampling period in which a sufficient quantity of fractional parts are accumulated to make up a whole leak unit. This is illustrated by the following algorithm:

leak-units-total$_n$ = leak-rate$_n$ + leak-units-fraction$_{n-1}$;
leak-units-whole$_n$ = whole part(leak-units-total$_n$);
leak-units-fraction$_n$ = fraction part(leak-units-total$_n$)
   = leak-units-total$_n$ − leak-units-whole$_n$ where n is the sample number.

The calculation of the number of leak units to be leaked in a given sampling period is calculated by the processor 32 in the preferred embodiment. There are four main method steps to be implemented by the process 32, namely: evaluate the fill-error X using the measured values of the write and read pointers WP,RP and the nominal fill level $F_{nom}$, and making any necessary adjustments for spare bits; evaluate the k1-term and k2-term; evaluate the leak rate from equation [9]; evaluate leak-units-whole.

The resulting control signal produced by the processor 32 provides the read clock adjuster module 34 with a value for the leak rate and information concerning whether the leak rate is a positive leak rate (speeding up the READ_CLK signal) or a negative leak rate (slowing down the READ_CLK signal), and information concerning the selected spacing between each successive leak-unit to be leaked. The information provided by the processor 32 to the read clock adjuster module 34 constitutes said control signal. The preferred mechanism for implementing or 'leaking' leak-units is described below.

When no leak-units are to be leaked, READ_CLK is generated by a straightforward division of the SCLK signal as evenly as possible. In the present example, where SCLK is 77.76 MHz and the nominal READ_CLK frequency is 2.048 MHz (which corresponds to the nominal frequency of an E1 data stream), this is achieved by producing thirty-one cycles of READ_CLK, each equal to thirty-eight cycles of SCLK, followed by one cycle of READ_CLK equal to thirty-seven cycles of SCLK. This 32-bit cycle (hereinafter referred to generally as the READ_CLK implementation period) of READ_CLK is repeated continuously to generate the nominal 2.048 MHz signal. It will be appreciated therefore that the cycles, or bits, of the generated READ_CLK signal can be considered as 'long' bits or 'short' bits. It is noted that the difference in length of some READ_CLK cycles over others introduces some inherent jitter into the READ_CLK signal. To minimise this jitter, it is in general preferred to intersperse the 'long' and 'short' bits substantially evenly. Alternatively, it is possible to select a primary clock signal SLCK which is an exact multiple of the nominal READ_CLK rate. In the present example, a 65.536 MHz or 131.072 MHz primary clock signal may be used to this end.

To leak a positive leak-unit, thirty cycles of READ_CLK are produced, each equal to thirty-eight cycles of SCLK, and two READ_CLK cycles are produced, each equal to thirty-seven cycles of SCLK. In this case, it is preferred that the 37-cycle bits of READ_CLK are spaced-apart by 16 bits of READ_CLK i.e. the shorter 37-cycle bits of READ_CLK are substantially evenly spaced over the READ_CLK 32-bit cycle. This helps to minimise the inherent jitter in the READ_CLK signal.

To leak a negative leak-unit, thirty-two cycles of READ_CLK are produced, each equal to thirty-eight cycles of SCLK.

In general, to leak a positive or negative leak-unit, the pattern of interspersed 'long' and 'short' READ_CLK cycles, or bits, in the READ_CLK implementation period is rearranged so that there are, for example, fewer 'long' bits and more 'short' bits when it is desired to leak a positive leak-unit, and more 'long' bits and fewer 'short' bits when it is desired to leak a negative leak-unit.

Preferably, the pattern is arranged so that the 'long' and 'short' bits are substantially evenly interspersed. It is noted that, in cases where the nominal READ_CLK rate is a multiple of the primary clock signal SCLK, there can be three 'lengths' of bit, or cycle, of the generated READ_CLK signal, namely a 'nominal' bit length, a 'long' bit length and a 'short' bit length.

It will be understood from the foregoing that, in the present example, there is an opportunity to leak a positive or negative leak-unit once every 32 bits or cycles of the READ_CLK signal (in general one opportunity every READ_CLK implementation period). In the preferred embodiment, the leak-units to be leaked during one sampling period i.e. the whole leak rate calculated by the process 32, are leaked over the sampling period following that for which the leak rate was calculated. However, the apparatus 30 must also arrange how the leak-units are distributed over said following sampling period.

Uneven distribution of leak-units over the sampling period, or other period over which the leak-units are to be leaked, also introduces a degree of inherent jitter into the READ_CLK signal. Preferably, therefore, the leak-units are leaked evenly over the sampling period, leak-units being spaced apart by equal intervals. In the above example, said intervals are expressed in units of 32 cycles of READ_CLK but in general can be expressed in units of the READ_CLK implementation period. It is not always possible to distribute the leak-units evenly as this depends on the number of leak-units to be leaked, the size of the period over which they are to be leaked (in the present example the sampling period) and the interval between leak opportunities (the READ_CLK implementation period).

As an alternative, the apparatus 30 can be arranged to leak the calculated number of leak-units over a period shorter than the sampling period, for example at the multiframe rate rather than every four multiframes. This reduces the inherent jitter by a corresponding factor. However, while this can be significant at high frequencies, the benefit at low frequencies is not significant. In view of the added processing power required to operate the leak mechanism at a higher rate than the sampling period, this method is not preferred for applications where the nominal READ_CLK rate is relatively low, for example, SDH to PDH data desynchronisation.

Figure 4:
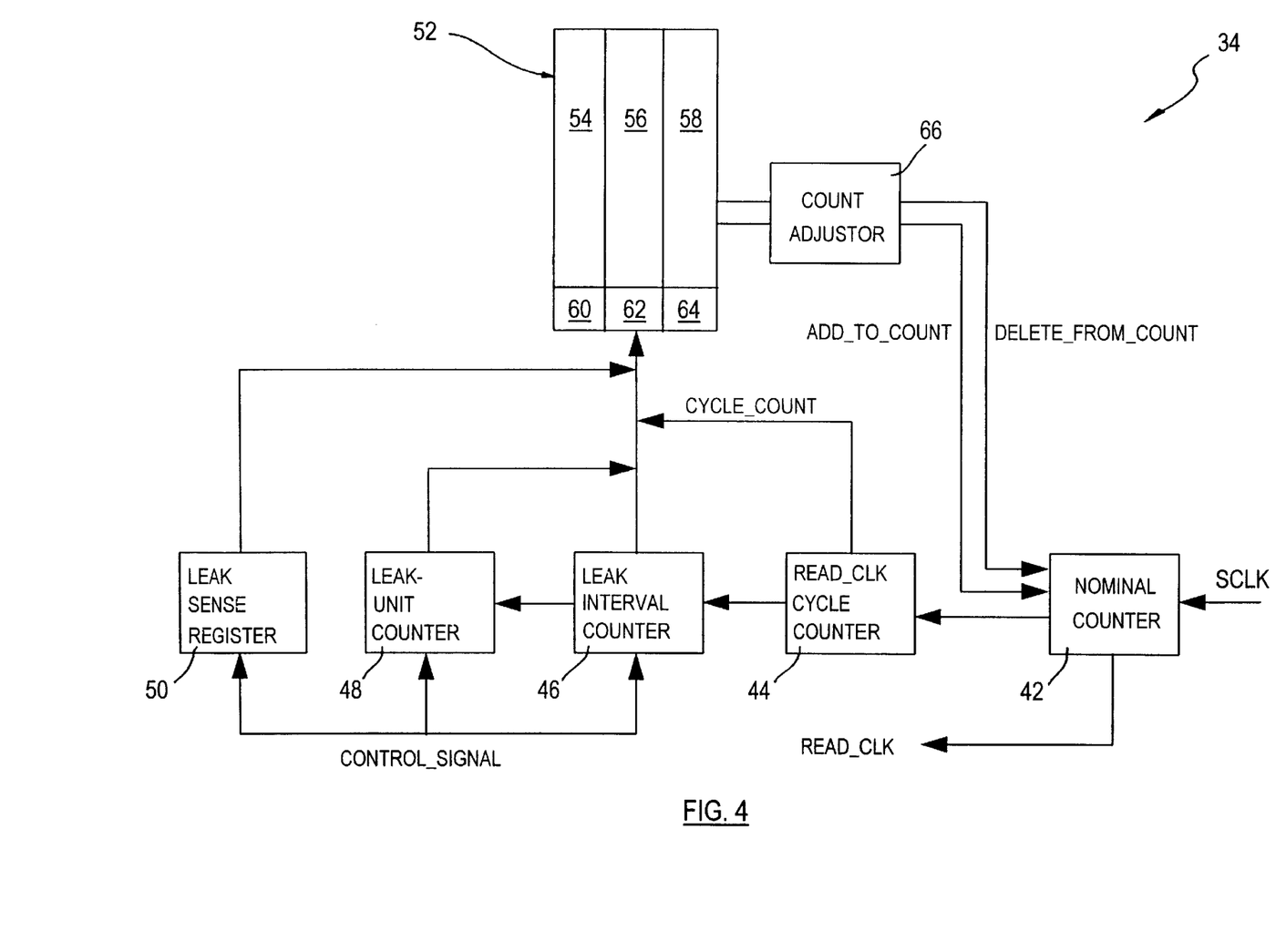
FIG. 4 is a schematic view of a read clock signal adjuster module for use in the apparatus of FIG. 3.

Referring now to FIG. 4, there is shown a schematic view of the read clock generator 34 for implementing the preferred leak mechanism described above.

The read clock generator 34 includes a first programmable counter 42 for dividing the primary clock signal SCLK to generate a cycle or bit of the READ_CLK signal based on either a nominal or an adjusted number of cycles of the primary clock signal SLCK. A second programmable counter 44 counts the number of READ_CLK cycles produced by the first programmable counter 42 to generate a signal CYCLE_COUNT. The second counter 44 is required when the output data stream DATA_OUT is divided into data channels, for example 64 Kbit/s channels, each channel corresponding to a number of cycles of READ_CLK. In the present example, the number of channels, N, may range from one, where the single channel corresponds with 32 cycles of the READ_CLK signal, and thirty-two, where each of the 32 channels correspond with one cycle of READ_CLK. In the present example, it is assumed that N=32, producing an E1 signal with a data rate of 2.048 Mbits/s. It will be apparent that in cases where N is equal to 1, the second counter 44 is not required.

The first counter 42 is programmable by the control signal generated by the processor 32 to count a nominal number of SCLK cycles per READ_CLK cycle, which in the illustrative example above is thirty-eight, upon initialisation of the apparatus 30. The second counter 44, when used, is initialised with a value for the required number of channels N.

A third programmable counter 46 is similarly programmable by the processor 32 with a-value representing the number of leak opportunities between successive leaks, namely, the required interval between successive leak-units being leaked. The processor 32 calculates this value depending on the number of leak-units to be leaked, the size of the period over which they are to be leaked (in the present example, the sampling period) and the interval between leak opportunities (in the present example, N cycles of READ_CLK where N=32 or 1215 cycles of SCLK, but in general referred to hereinafter as the READ_CLK implementation period). The third counter 46 is programmed by the processor 32 every sampling period.

A fourth programmable counter 48 is also programmable by the processor 32 with a value representing the required number of leak-units to be implemented during a given sampling period. The fourth counter 48 is programmed by the processor 32 every sampling period.

The programmable counters 42, 44, 46, 48 are interconnected to operate in synchronism with one another.

A programmable register 50 is programmable by the processor 32 with a value representing the sense of the leak-units, namely, whether leak-units for a given sampling period are to be positive leak-units or negative leak-units. The register 50 is programmed by the processor 32 every sampling period.

The programmable counters 42, 44, 46, 48 and register 50 operate in conjunction with a look-up table 52 which stores the patterns of 'long', 'short' and, where applicable 'nominal', READ_CLK bit cycles which are required to implement no leak-unit (in which case READ_CLK is generated at its nominal frequency), a positive leak-unit (in which case READ_CLK is generated at a faster rate than its nominal frequency) or a negative leak-unit (in which case READ_CLK is generated at a slower rate than its nominal frequency) over the READ_CLK implementation period. For example, the look-up table 52 may comprise a nominal pattern column 54, a positive leak-unit pattern column 56 and a negative leak-unit pattern column 58, each column containing a binary entry for each cycle or bit of the READ_CLK signal in the READ_CLK implementation period, each column further containing a sense entry 60, 62, 64, indicating whether the said binary entry corresponds to an addition or a deletion of a cycle of the primary clock SCLK from the READ_CLK cycle to which the said binary entry corresponds.

In use, the output of the leak interval counter 46 signals when it is required to implement a leak-unit. The leak-unit counter 48 counts the number of leak-units which have been implemented, or leaked, in the present sampling period and produces an output to disable the output of the leak interval counter 46 when all of the required leak-units have been implemented for the sampling period. When a leak-unit is required to be implemented, the output of the leak sense register 50 indicates whether the positive leak-unit pattern column 56 or the negative leak-unit pattern column 58 of the look-up table 52 is addressed. When no leak-unit is required, the nominal pattern column 54 is addressed. The output signal CYCLE_COUNT determines which row of the appropriate column is addressed. When the counter 44 is not required, i.e. N=1, only one of the 32 rows of the table 52 is selectable.

Thus, the READ_CLK cycle counter 44 (when present), the leak interval counter 46, the leak-unit counter 48 and leak sense register 50 together serve as a pattern selector module, responsive to the control signal such that their respective output signals determine which row and column of the look-up table 52 is addressed and therefore which cycle pattern is implemented. The corresponding look-up table entry indicates whether or not the nominal number of SCLK cycles in the current READ_CLK bit or cycle needs to be adjusted. If adjustment is required, the sense entry 60, 62, 64 corresponding to the column being addressed determines whether the required adjustment is the addition or the deletion of a SCLK cycle to the current READ_CLK cycle. A first counter programming module 66, which is responsive to the control signal via the interaction of the counters 44, 46, 48, the register 50 and the look-up table 52, is therefore arranged to produce an ADD_TO_COUNT signal, when it is required to add to the length of the READ_CLK cycle, or a DELETE_FROM_COUNT signal when it is required to shorten the length of the READ_CLK cycle. The ADD_TO_COUNT and DELETE_FROM_COUNT signals are provided to the nominal counter 42 to add to, and remove from, respectively, the number of SCLK cycles counted for the current READ_CLK cycle.

The apparatus 30, together with the FIFO 10, may be implemented as an Application Specific Integrated Circuit (ASIC) (not shown). The FIFO 10 may be implemented in dual port RAM within the ASIC, and the data processor 32 may comprise a RISC or similar processor, also included in the ASIC, programmed to implement the required functions of the error detector module 33, the integrator module 35 and the control module 37. The read clock adjuster module 34 may be implemented using hardware programmable counters and registers. The look-up tables 36, 52 can be implemented as data arrays in a programmable ROM within the ASIC. The primary clock signal SCK can be provided internally or externally of the ASIC in conventional manner. It will be apparent to a skilled person that the apparatus 30 can be implemented by alternative means.

The apparatus 30 of the invention is advantageously included in a telecommunications network node such as a multiplexer, a cross-connect, a router, an exchange or other signal processing equipment for use in a telecommunications network, particularly, but not exclusively, where descynchronisation of a plesiochronous data stream from a synchronous data stream is required.

It will further be apparent that the invention is not limited to the embodiments described above, which may be modified or varied without departing from the scope of the invention.

What is claimed is:

1. An apparatus for controlling the read clock signal rate of a First-In First-Out (FIFO) data memory, the apparatus comprising:
    an error detector module, responsive to a change in the quantity of data contained in the FIFO data memory to generate an error signal;
    an integrator module, for integrating said error signal, scaled by a first scaling parameter, to generate an integrated error signal;
    a control module, responsive to said error signal and to said integrated error signal, for generating a control signal which includes said error signal, scaled by a second scaling parameter, and said integrated error signal; and
    a read clock rate adjuster module, responsive to said control signal to adjust the rate of the read clock signal,
    wherein the control module is arranged to determine a value for at least one of the first and second scaling parameters according to the level of the error signal.

2. An apparatus as claimed in claim 1, wherein the control module is arranged such that the or each determined scaling parameter value varies at a rate which increases as the absolute error signal level increases, and decreases as the absolute error signal level decreases.

3. An apparatus as claimed in claim 1, wherein the control module is arranged such that the or each determined scaling parameter value varies substantially in accordance with an exponential function of the absolute error signal level.

4. An apparatus as claimed in claim 1, wherein the control module is arranged to calculate the value of at least one of the first and second scaling parameters by application of a mathematical function to the absolute error signal level.

5. An apparatus as claimed in claim 1, wherein the control module is arranged to derive the value of at least one of the first and second scaling parameters from a data array containing data entries, which include scaling parameter values, tabulated against error signal level.

6. An apparatus as claimed in claim 1, wherein the error detector module is arranged to derive the error signal from the difference between a read address pointer of the FIFO data memory and a write address pointer of the FIFO data memory.

7. An apparatus as claimed in claim 1, wherein the error signal comprises a series of discrete error values and the integrator module is arranged to perform a summation operation on said error values, each error value being scaled by a respective first scaling parameter.

8. An apparatus as claimed in claim 1, wherein the apparatus comprises a data processor programmed to implement the error detector module, the integrator module and the control module.

9. An apparatus as claimed in claim 1, wherein the read clock rate adjuster module is arranged to operate on a primary clock signal and comprises:
    a first counter, arranged to divide said primary clock signal to generate a nominal read clock signal wherein successive generated cycles of the read clock signal correspond to a respective nominal number of primary clock cycles;
    a first counter programming module, arranged to generate a first counter programming signal for adjusting the number of primary clock cycles to which a generated read clock cycle corresponds,
    wherein the first counter programming module is responsive to said control signal to add one or more primary clock cycles to one or more of said respective nominal primary clock cycle numbers when the control signal indicates that the read clock signal rate is to be decreased, and to subtract one or more primary clock cycles from one or more of said respective nominal primary clock cycle numbers when the control signal indicates that the read clock signal rate is to be increased.

10. An apparatus as claimed in claim 9, wherein the number of primary clock cycles to which a cycle of the read clock signal corresponds is determined in accordance with a cycle pattern, which stipulates a respective primary clock cycle number for a selected number of successive read clock cycles, the read clock rate adjuster module further including:

a data memory containing a second data array for storing a nominal cycle pattern, a positive cycle pattern, and a negative cycle pattern; and a pattern selector module, responsive to the control signal and arranged to select said nominal cycle pattern, when the control signal indicates that the read clock signal rate is to be the nominal read clock rate, or to select said positive cycle pattern, when the control signal indicates that the read clock signal rate is to be increased, or to select said negative cycle pattern, when the control signal indicates that the read clock signal rate is to be decreased.

11. A telecommunications network node including an apparatus as defined in claim 1.

12. A method of controlling the read clock signal rate of a First-In First-Out (FIFO) data memory, the method comprising:

generating an error signal responsive to a change in the quantity of data contained in the FIFO data memory;

generating an integrated error signal by performing an integration operation on said error signal scaled by a first scaling parameter;

generating a control signal which includes said error signal, scaled by a second scaling parameter, and said integrated error signal;

determining a value for at least one of said first or second scaling parameters according to the level of the error signal;

adjusting the read clock signal rate according to said control signal.

13. A method as claimed in claim 12, further including varying the or each determined scaling parameter value at a rate which increases as the absolute error signal level increases, and decreases as the absolute error signal level decreases.

14. A method as claimed in claim 12, further including varying the or each determined scaling parameter value substantially in accordance with an exponential function of the absolute error signal level.

15. A method as claimed in claim 12, further including applying a mathematical function to the absolute error signal level to calculate the value of at least one of said first and second scaling parameters.

16. A method as claimed in claim 12, further including deriving the value of at least one of said first and second scaling parameters from a data array.

17. A method as claimed in claim 12, further including measuring the difference between a read address pointer and a write address pointer of the FIFO data memory to derive the error signal.

18. A method as claimed in claim 12, wherein the error signal comprises a series of discrete error values and said integration operation includes summing successive error signal values, each value being scaled by a respective first scaling parameter.

19. A method as claimed in claim 12, comprising dividing a primary clock signal to generate a nominal read clock signal wherein successive generated cycles of the read clock signal correspond to a respective nominal number of primary clock cycles;

adjusting, in response to said control signal, the number of primary clock cycles to which a generated read clock cycle corresponds, the adjustment involving adding one or more primary clock cycles to one or more of said respective nominal primary clock cycle numbers when the control signal indicates that the read clock signal rate is to be decreased, or subtracting one or more primary clock cycles to one or more of said respective nominal primary clock cycle numbers when the control signal indicates that the read clock signal rate is to be increased.

20. A method as claimed in claim 12, further comprising determining the number of primary clock cycles to which a cycle of the read clock signal corresponds in accordance with a cycle pattern, which stipulates a respective primary clock cycle number for a selected number for a selected number of successive read clock cycles;

selecting a nominal cycle pattern when the control signal indicates that the read clock signal rate is to be the nominal read clock rate;

selecting a positive cycle pattern when the control signal indicates that the read clock signal rate is to be increased; or selecting a negative cycle pattern when the control signal indicates that the read clock signal rate is to be decreased.

21. A desynchronising apparatus for a telecommunications network system, the apparatus being arranged to receive an input data stream, which comprises plesiochronous data elements decoded from a synchronous transmission format, and to produce an output data stream, comprising said plesiochronous data elements, at a substantially constant frequency, the apparatus comprising:

a FIFO data memory for storing said decoded plesiochronous data elements;

a read clock signal for controlling the rate at which said decoded plesiochronous data elements are read from the FIFO data memory to produce said output data stream;

an error detector module, responsive to a change in the quantity of data contained in the FIFO data memory to generate an error signal;

an integrator module, for integrating said error signal, scaled by a first scaling parameter, to generate an integrated error signal;

a control module, responsive to said error signal and to said integrated error signal, for generating a control signal which includes said error signal, scaled by a second scaling parameter, and said integrated error; and a read clock rate adjuster module, responsive to said control signal to adjust the rate of the read clock signal, wherein the control module is arranged to determine a value for at least one of the first and second scaling parameters according to the level of the error signal.

22. A desynchronising apparatus as claimed in claim 21, wherein the control module is arranged such that the or each determined scaling parameter value varies substantially in accordance with an exponential function of the absolute error signal level.

23. In a desynchronising apparatus for a telecommunications network system, the apparatus being arranged to receive an input data stream which comprises plesiochronous data elements decoded from a synchronised transmission format, and to produce an output data stream, comprising said plesiochronous data elements at, a substantially constant frequency, the apparatus further comprising a First-In First-Out (FIFO) data memory for storing said decoded plesiochronous data elements and a read clock signal for controlling the rate at which the said decoded plesiochronous data elements are read from the FIFO data memory to produce said output data steam, a method of controlling the read clock signal rate comprising:

generating an error signal responsive to a change in the quantity of data contained in the FIFO data memory;

generating an integrated error signal by performing an integration operation on said error signal scaled by a first scaling parameter;

generating a control signal which includes said error signal, scaled by a second scaling parameter, and said integrated error signal;

determining a value for at least one of said first or second scaling parameters according to the level of the error signal; adjusting the read clock signal rate according to said control signal.

24. A method as claimed in claim 23, further including varying the or each determined scaling parameter value substantially in accordance with an exponential function of the absolute error signal level.

* * * * *